Feb. 23, 1926.

R. FOX

SWITCH

Filed Jan. 30, 1924

1,574,475

INVENTOR.

Ross Fox

By: Otto H. Krueger,
his Atty.

Patented Feb. 23, 1926.

1,574,475

UNITED STATES PATENT OFFICE.

ROSS FOX, OF LOS ANGELES, CALIFORNIA.

SWITCH.

Application filed January 30, 1924. Serial No. 689,456.

*To all whom it may concern:*

Be it known that I, Ross Fox, a citizen of the United States, residing at Los Angeles, in the county of Los Angeles and State of California, have invented a new and useful Switch, of which the following is a specification.

This invention relates to devices used for closing an electric circuit, and more particularly for operating automobile signals.

One of the objects of this invention is to provide long leaf-springs or leaf contact members, by which contact can be made at different points of the leaf members.

Another object is to provide leaf-like contact members on the rim of a steering wheel, by which contact can be made by taking hold of different parts or points of the steering wheel.

Another object is to provide a contact structure that can be applied to the rim of a steering wheel, to reach over a proportionally large portion of the rim of such wheel.

Another object is to provide a contact structure to reach over a large portion of a steering wheel embodying leaf-like contact members to extend through a large part of such contact structure.

Other objects will appear from the following description and appended claim as well as from the accompanying drawing, in which—

Figure 1:
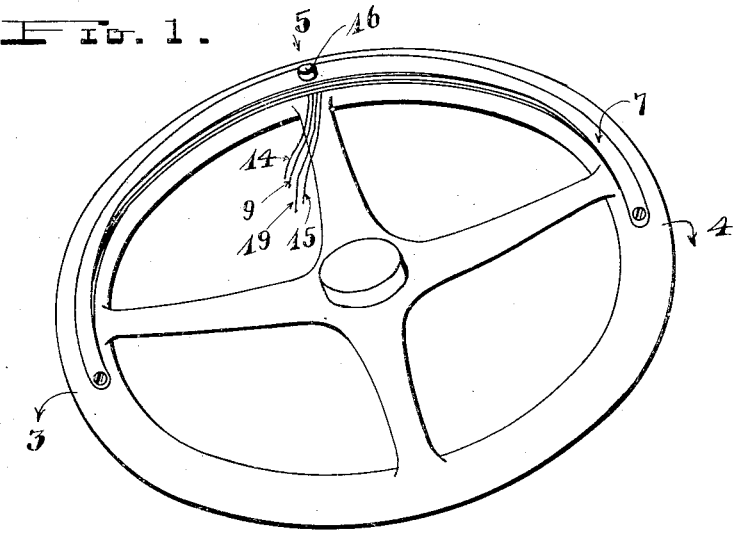
Fig. 1 is a perspective view of a steering wheel with a contact structure applied to the top, of a form embodying the invention.

In operating the steering wheel of an automobile, a great number of operators appear to have their hands on the lower portion of the steering wheel rim, on the rim section close to the seat of the automobile, indicated by the arrows 3 and 4 in the drawing in Fig. 1. The portion of the rim between the arrows 3 and 4 will hereafter be referred to as the lower portion of the rim for the sake of simplicity in describing the invention.

A steering wheel may easily be controlled by taking hold of the rim at any point between the arrows 3 and 4, in such a manner that the operator of an automobile may rest comfortably in the seat of the automobile behind the steering wheel.

When a quick or extensive turning of the steering wheel becomes necessary, to the left or to the right, as by a driving of the automobile around a corner, an operator instinctively takes hold of the rim at a point closer to the highest portion of the rim, near the point indicated by the arrow 5. For a right-hand turn, the hand may be placed at any point between the arrows 4 and 5, while for a left-hand turn a hand may be placed at any point between the arrows 3 and 5.

However, an operator is not always able to reach a certain point of the rim. Therefore, a contact-button placed at a certain point of the rim may be missed by an operator when driving in heavy traffic.

One of the main objects of this invention is therefore to provide contacts that can not very well be missed by an operator. The individual contact members are made to reach over a large portion of the rim of leaf material that may be caused to contact at different points of its length.

The whole device is on the other hand made of a form to offer practically no obstruction to a hand gliding over the rim of a steering wheel to which the device is applied, even though the device preferably is applied to the surface of the rim of the steering wheel.

Figure 2:
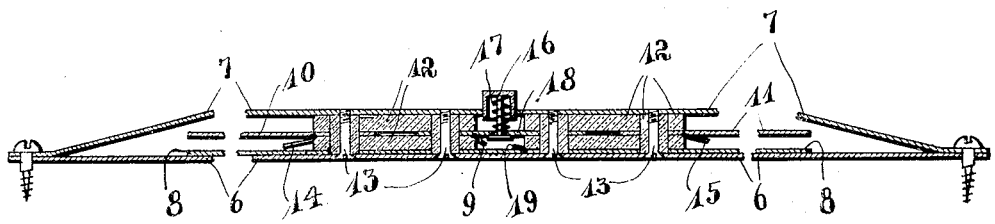
Fig. 2 is a fragmentary side elevation, partly in section, illustrating a simple form of a contact structure embodying the invention.

In Fig. 2, a simple form is illustrated which is in full agreement with the above. The lower leaf or plate 6 may be of insulating material, as of fiber, bakelite, hard-rubber, as may also be the top leaf or plate 7, though metal would do no material harm, since the current used for such signals is not very strong as that the operator might be injured.

The top plate 7 is preferably made flexible to such an extent that it will easily yield to the pressure of a hand taking hold of the rim so as to collapse or bend towards the base plate 6.

One contact is disposed above the base plate 6 nearly over the whole length of the base plate as indicated at 8—8. This contact member is preferably used for the so-called hot-wire connection. A wire is indicated at 9, which may serve as the one wire for several contacts.

A second contact member is disposed in spaced relation to the contact member or leaf 8, as indicated at 10.

A third contact member or leaf is disposed in spaced relation to the contact member 8, as indicated at 11.

Insulating material is provided between the several contact leaves 8, 10 and 11, as indicated at 12.

Screws or rivets 13 serve to hold the several leaf-contacts and base and cover plates together.

Separate wire connections are provided for the contacts 10 and 11, as indicated at 14 and 15.

A push-button 16 is disposed at about the middle of the whole structure, being held in neutral position by a spring 17. A separate contact leaf 18 is provided for this button, with a separate wire connection, as indicated at 19. The contact plate or leaf 18 is also normally spaced and insulated from the other contact members. By a pushing of the button, the stem of the button makes contact between the contact plate 18 and the contact 8.

The cover plate 7 is so yieldable that a pressing on the plate 7 will allow a pressing or moving of the contact plates 10 and 11 towards the contact 8. Contact can therefore be made between the contact member 8 and the contact member 10 by pressing the cover plate 7 towards the wheel rim at any point of the whole length of the contact member 10 between the arrows 3 and 5, considering the illustration of Fig. 2 together with Fig. 1. Contact can also be made between the contact member 8 and the contact member 11 by pressing the cover plate 7 towards the wheel rim at any point of the whole length of the contact member 11 between the points indicated by the arrows 4 and 5 in Fig. 1.

The contact member 10 is preferably used in connection with a left-hand signal, while the contact member 11 is preferably used in connection with a right-hand signal. The push-button may serve for horn connection.

An electric circuit may be closed between the wire connection 9 and any of the wire connections 14, 15 and 19.

As illustrated in Fig. 1, the whole structure of Fig. 2 is easily applied to the top surface of the upper portion of the rim of a steering wheel.

Having thus described my invention, I claim:

In an automobile signal, a base plate formed edgewise to follow the circle of the rim of a steering wheel of an automobile over a proportionally large portion and adapted to be applied to the top of the steering wheel, a cover plate to fit over the base plate spaced practically parallel from the base plate through the larger portion of its length and being attachable to the steering wheel together with the base plate, a leaf-like contact plate disposed over the base plate and extending through the whole space between the base and cover plates, insulating material disposed in the space between base and cover plate at about the middle of the length, other contact plates embedded in the insulating material and extending towards the ends of the base and cover plate normally spaced from the first-named contact plate between the base and cover plates, a smaller contact plate insulated from all other contact plates, and a push-button having contact with the last-named small contact plate and adapted to be pushed towards the first-named contact plate, the second-named contact plates to be moved towards the first-named contact plate by a bending and pressing of the cover plate towards the base plate.

In testimony that I claim the foregoing as my invention I have signed my name.

ROSS FOX.